April 21, 1964     W. KOHLHAGEN     3,129,495
MOTOR FIELD UNIT AND METHOD OF MAKING IT
Original Filed April 26, 1960
4 Sheets-Sheet 1
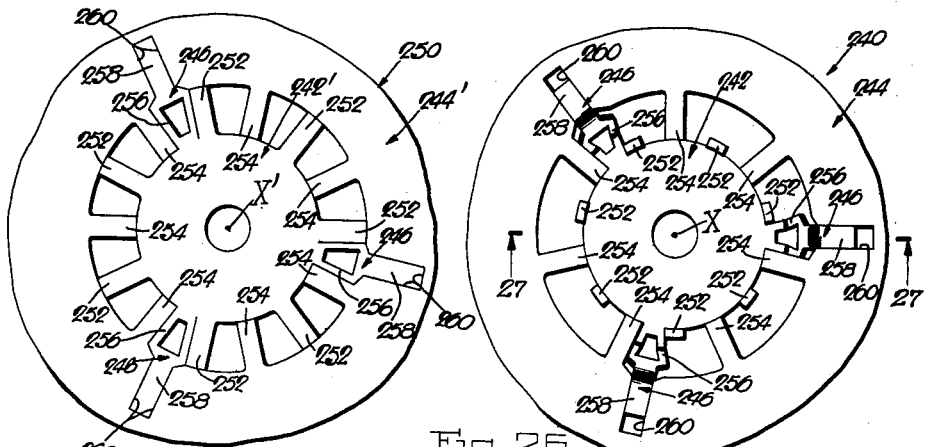
Fig.25    Fig.26
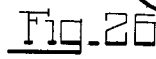
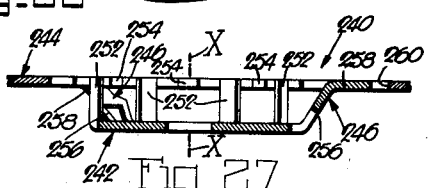
Fig.27
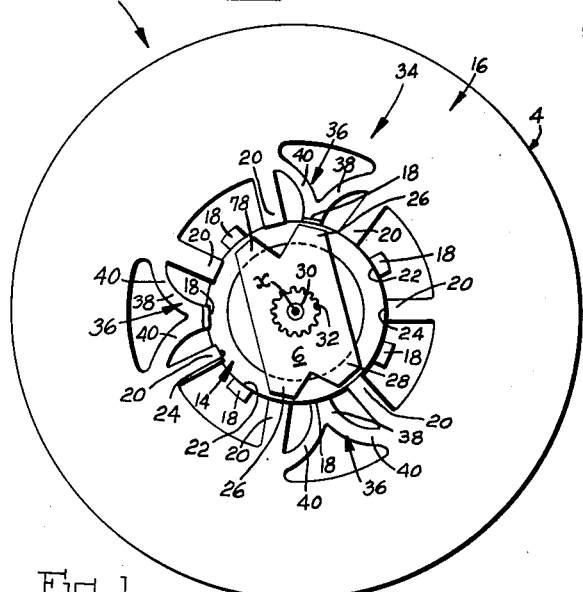
Fig.1
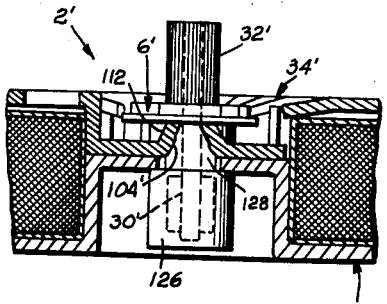
Fig.2A
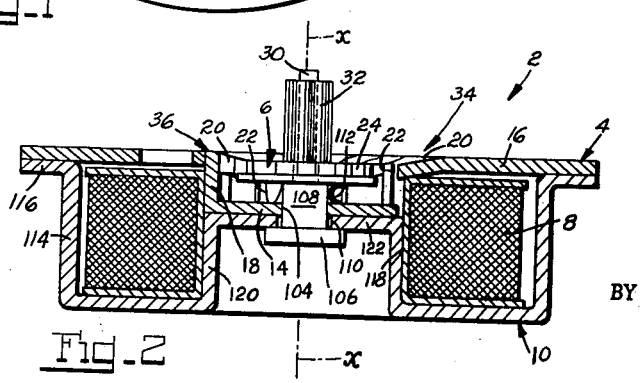
Fig.2
INVENTOR.
Walter Kohlhagen
BY
Attorney

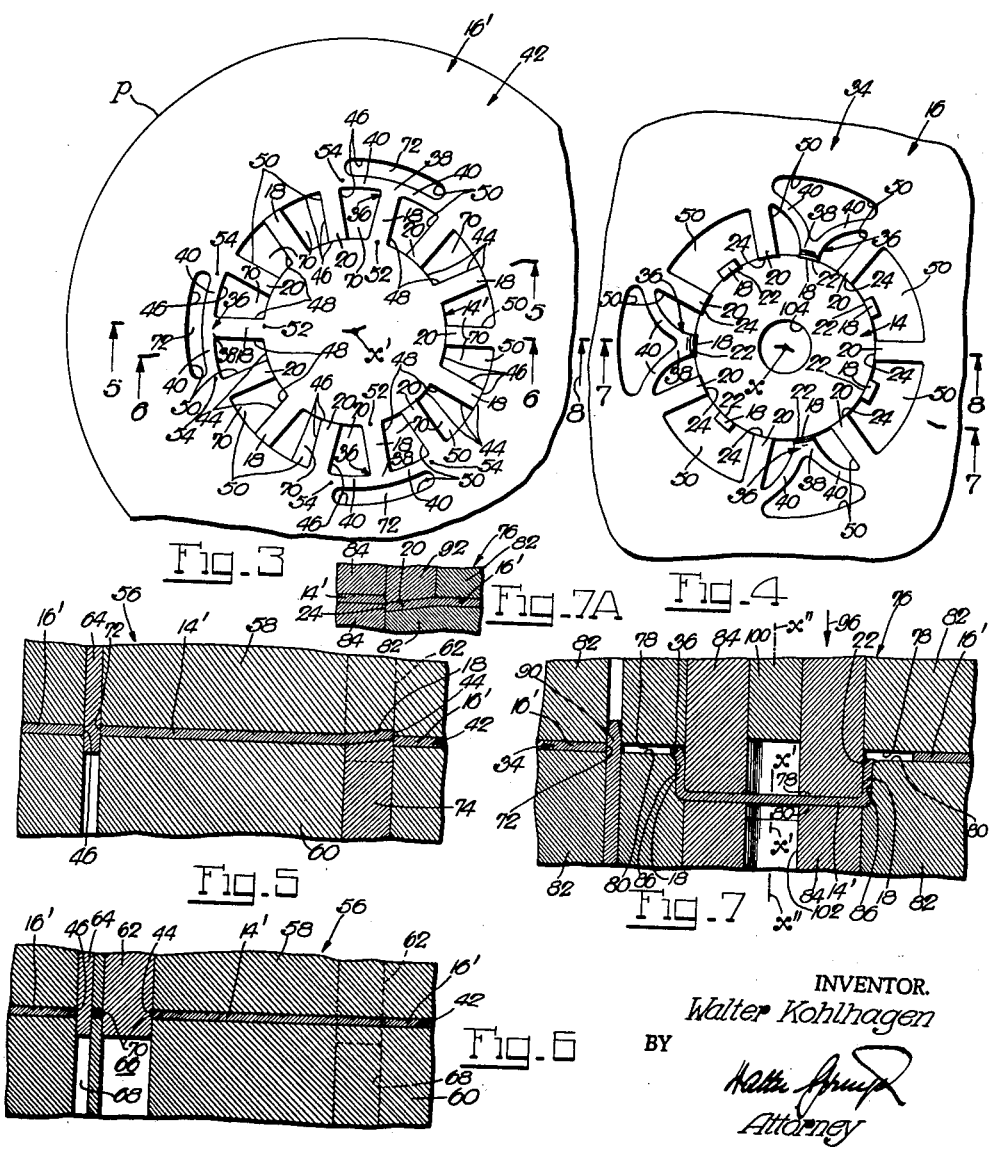

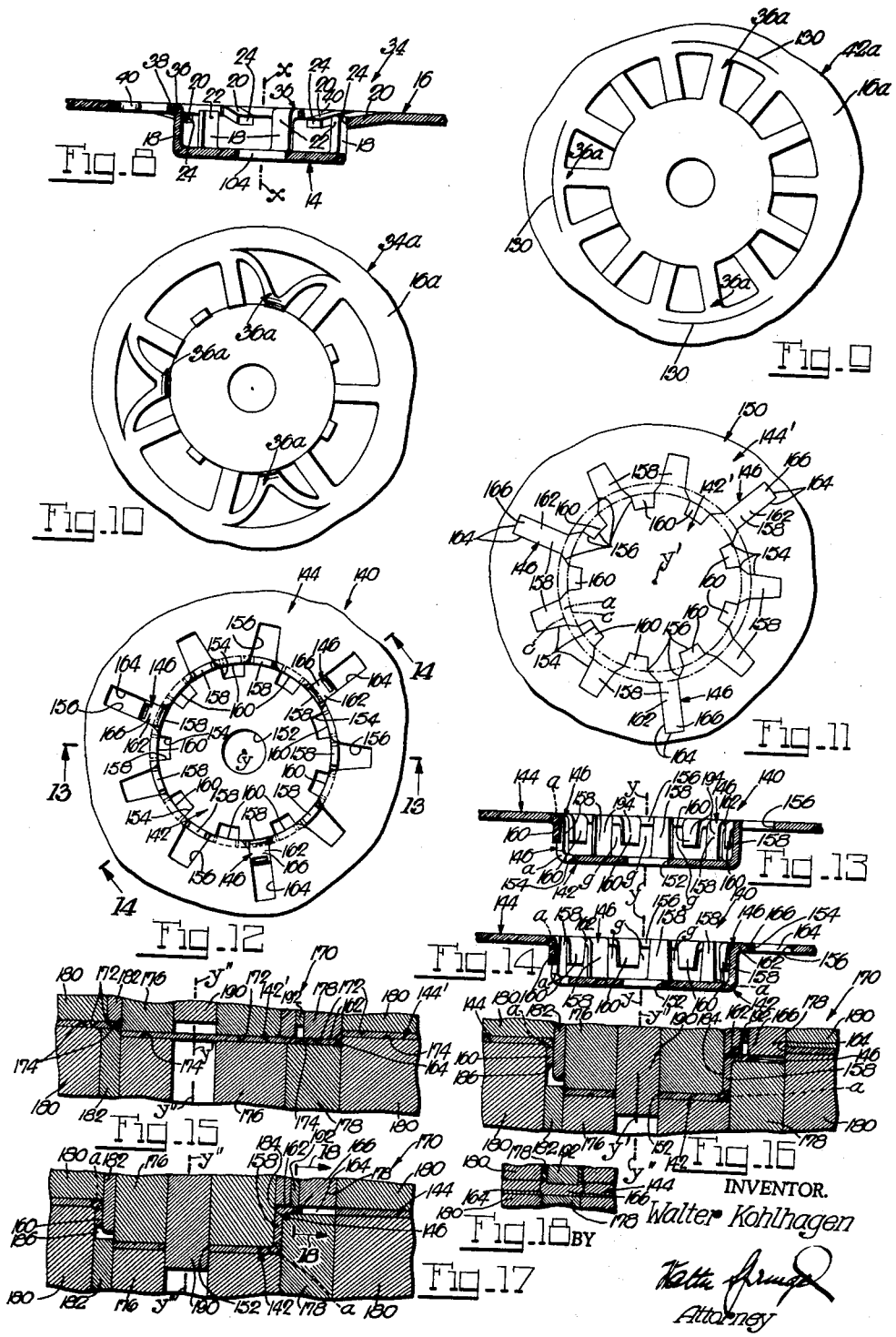

April 21, 1964   W. KOHLHAGEN   3,129,495
MOTOR FIELD UNIT AND METHOD OF MAKING IT
Original Filed April 26, 1960   4 Sheets-Sheet 4
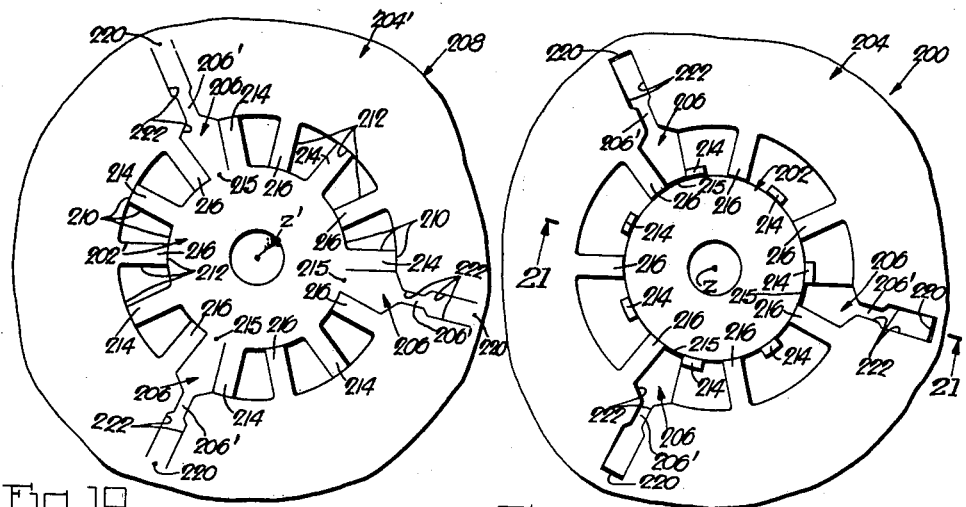
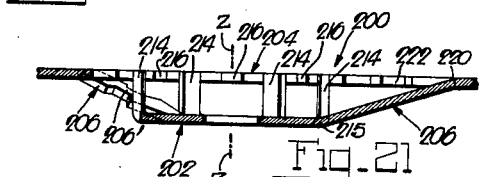
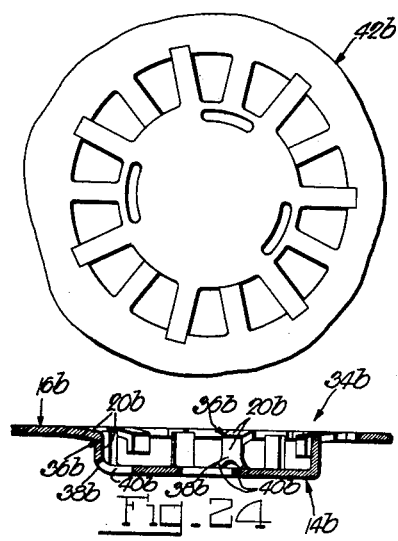
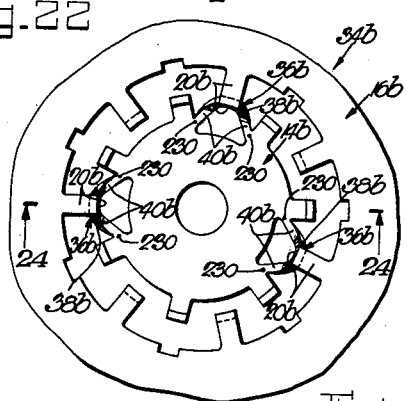
INVENTOR.
Walter Kohlhagen
BY
Attorney United States Patent Office 3,129,495
Patented Apr. 21, 1964

3,129,495
MOTOR FIELD UNIT AND METHOD OF
MAKING IT
Walter Kohlhagen, 818 Oakley Ave., Elgin, Ill.
Original application Apr. 26, 1960, Ser. No. 24,827, now Patent No. 3,068,375, dated Dec. 11, 1962. Divided and this application June 1, 1961, Ser. No. 114,213
5 Claims. (Cl. 29—155.56)

This invention relates to synchronous motors of reaction type in general, and to field structures of motors of this type in particular.

This application is a division of application Serial No. 24,827, filed April 26, 1960, now Patent No. 3,068,375, dated December 11, 1962.

Motors of the type with which the present invention is concerned have a permanent-magnet rotor, and a field structure with poles disposed circularly about the rotor axis and arranged in two sets of which successive poles of one set alternate with successive poles of the other set, and the poles of both sets are, during energization of an associated flux-inducing field coil, of opposite polarities at any instant, with their polarities changing in phase with the alternating current supplied to the coil to compel the rotor to step or turn in synchronism with the alternation of the current. In this connection, and as is well known, the accuracy of the coordination of the poles of both sets, primarily in point of their circular disposition and angular spacing from each other, is a prime factor in the reliability of the motor to start and perform and also in its load capacity. The field structure, which customarily forms a receptacle for the coil and provides an uninterrupted flux path around the contained coil from one pole set to the other, is usually composed of several assembled parts, and the poles of either set are kept separated throughout from the poles of the other set to compel their flux linkage across the rotor for operation of the motor. To the latter end, the pole sets are customarily provided on separate field plates which are spaced from each other in the direction of the rotor axis and arranged as the opposite structural end parts in the field assembly.

Motors of this type are suited especially, though not exclusively, for use in electric clocks and in the much larger field of timers for all kinds of utility devices. Among their primary requirements to this end are relatively small size, reliable performance and low cost, and while they readily meet the size requirements they do not as readily meet desired performance requirements or cost requirements, or both, for there are constant demands and attempts to improve their performance and also reduce their cost even further. Thus, while the field structures of these motors are mostly formed of simple parts which readily lend themselves to efficient mass production at low cost, some of these parts have inevitable tolerances at least in their shapes. Coupled with these tolerances of individual field parts are inevitable tolerances in their coordination on their assembly, and at least some of these compound tolerances have an adverse effect on the coordination of the poles of both sets in the assembled field structure. As a result, special efforts have heretofore been made and various expediencies resorted to in the design and assembly of these field structures to obtain as accurate coordination as possible of the poles of both sets. However, insofar as known, these efforts and expediencies have at best only minimized, but not eliminated, adverse effects of the inevitable tolerances in the assembled field structures on the coordination of the poles thereof, wherefore the accuracy of the coordination of these poles, while adequate in many field structures, leaves something to be desired in a good many other field structures. Also, the special attention given to accurate coordination of these poles accounts for a goodly share of the cost of motors of this type.

It is among the objects of the present invention to provide for motors of this type field structures which lend themselves to efficient mass production at no greater cost than that of previous field structures, yet must in each instance have greater accuracy in the coordination of their poles than could be averaged in previous mass-produced field structures.

It is another object of the present invention to provide for motors of this type mass-produced field structures in which the coordination of the poles is to all practical intents and purposes unaffected by any and all tolerances in the assembled field structures, thereby eliminating the only cause of inadequate pole coordination for which there was no full remedy heretofore and, accordingly making it possible in the first place to achieve optimum accuracy in the coordination of these poles in each instance.

It is a further object of the present invention to provide for motors of this type field structures which not only have the aforementioned optimum accuracy in the coordination of their poles in each instance, but which may also be mass-produced at even less cost than previous field structures.

Another object of the present invention is to provide for a motor of this type a field structure in which the aforementioned field plates rely for the coordination of their poles, not on the intermediate field structure which constitutes their direct flux link, but rather on bridging elements which connect and permanently unite, and hence integrate, these field plates, yet afford no effective flux short-circuiting paths between the latter, thus achieving the aforementioned objective of rendering the tolerances in the assembled field structure without effect on the coordination of the poles.

A further object of the present invention is to provide for a motor of this type a field structure in which the aforementioned integrated field plates are not at all separate structural end parts of the field structure but, instead, are integral formations or sections of a single piece of non-permanent magnetic plate stock, with the aforementioned bridging elements also being integral formations of the same single piece of plate stock and arranged to become at least in part substantially saturated on flux flow in the field. With this single-piece polar unit being entirely self-contained, the same may be assembled with the rest of the field structure without any regard to the coordination of the field poles and with sole regard to direct flux linkage of its field plates with the rest of the field structure, thus not only greatly facilitating the assembly of the field structure but also affording a wide choice in the design and mode of assembly of the field structure.

It is another object of the present invention to provide for a motor of this type a field structure with the aforementioned single-piece polar unit of which the inner field plate has provisions, preferably a center aperture, for solely locating bearing means for a rotor, thereby also coordinating the rotor axis most accurately with the coordinated field poles exclusively within this polar unit and, hence, also without any adverse effect from any and all tolerances in the rest of the field structure.

It is a further object of the present invention to obtain the aforementioned single-piece polar unit by initially blanking the same from flat plate stock and then forming it into its final shape, all in a die operation or operations in which the inner and outer field plates with their poles and their integrating bridges are throughout their formation closely held between pressure and forming surfaces of cooperating dies, thereby not only achieving the formation of this polar unit in most efficient mass production at minimum cost, but also holding the coordination of all parts of this polar unit, including their poles, with the exceptionally high accuracy which a relatively closely held die operation will attain. In thus forming the single-piece polar unit, there is this further advantage that the inner field plate thereof is exclusively formed of plate stock which must necessarily be blanked from the outer field plate for the outline of the inner-pole pattern of the latter, and which heretofore was useless for anything other than scrap, thereby achieving an exceedingly large saving in field plate stock and an appreciable reduction in the cost of field structures of this type for this reason alone.

Another object of the present invention is to form the single-piece polar unit in a die operation such that the connecting bridge formations between the outer and inner field plates are and remain continuous with the latter from the initial blanking to the finish-formation, including relative axial displacement, of these field plates, with the bridge formations being arranged so that the unavoidable stresses induced therein on the axial displacement of the field plates are easily controlled and neither structurally weaken the polar unit nor adversely affect the accurate die-implemented coordination of the poles thereof.

A further object of the present invention is to provide an alternative single-piece polar unit of which the connecting bridge formations between the field plates are integral with only one field plate and are nevertheless firmly united with both field plates, by initially blanking the field plate with the bridge formations thereon from the other plate and then jamming back into the latter the ends of the bridge formations which are available for this purpose when the latter span the axially displaced field plates. This alternative single-plate polar unit will have the same advantages as the aforementioned completely integral polar unit, yet its bridge formations are subjected to only negligible stresses regardless of their lengths, wherefore this alternative polar unit also readily permits axial spacing of the field plates within wide limits with ensuing additional important advantages.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a plan view of a motor having a featured polar unit;

FIG. 2 is a section through the same motor;

FIG. 2A is a fragmentary section through a modified motor having the same featured polar unit;

FIG. 3 is an enlarged fragmentary plan view of a blank from which the featured polar unit is formed;

FIG. 4 is a fragmentary plan view of the polar unit formed from the blank of FIG. 3;

FIGS. 5, 6, 7 and 7A are fragmentary sections through dies in which the blank of FIG. 3 is, in progressive stages and in accordance with a featured method, formed into the polar unit of FIG. 4, with the blank in the dies of FIGS. 5, 6 and 7 being shown in sections taken substantially on the lines 5—5 and 6—6 of FIG. 3 and on the line 7—7 of FIG. 4, respectively;

FIG. 8 is a fragmentary section through the polar unit as taken on the line 8—8 of FIG. 4;

FIG. 9 is a fragmentary plan view of a blank for a modified polar unit;

FIG. 10 is a fragmentary plan view of the modified polar unit formed from the blank of FIG. 9;

FIG. 11 is a fragmentary plan view of a blank for another modified polar unit;

FIG. 12 is a fragmentary plan view of the modified polar unit formed from the blank of FIG. 11;

FIGS. 13 and 14 are fragmentary sections through the same modified polar unit as taken on the lines 13—13 and 14—14, respectively, of FIG. 12;

FIGS. 15 to 17 are fragmentary sections through a die in which the blank of FIG. 11 is formed into the polar unit of FIGS. 12 to 14 in progressive stages and in accordance with another featured method;

FIG. 18 is a fragmentary section taken on the line 18—18 of FIG. 17;

FIG. 19 is a fragmentary plan view of a blank for a further modified polar unit;

FIG. 20 is a fragmentary plan view of the modified polar unit formed from the blank of FIG. 19;

FIG. 21 is a fragmentary section through the same modified polar unit as taken on the line 21—21 of FIG. 20;

FIG. 22 is a fragmentary plan view of a blank for another modified polar unit;

FIG. 23 is a fragmentary plan view of the modified polar unit formed from the blank of FIG. 22;

FIG. 24 is a fragmentary section through the same modified polar unit as taken on the line 24—24 of FIG. 23;

FIG. 25 is a fragmentary plan view of a blank for still another modified polar unit;

FIG. 26 is a fragmentary plan view of the modified polar unit formed from the blank of FIG. 25; and FIG. 27 is a section through the same modified polar unit as taken on the line 27—27 of FIG. 26.

Referring to the drawings, and more particularly to FIGS. 1 and 2, the reference numeral 2 designates a synchronous reaction motor having a field 4 and a rotor 6 of permanent-magnet type. The field 4 comprises a field coil 8, a magnetic coil receptacle 10, and inner and outer field plates 14 and 16 spaced apart in the direction of the rotor axis $x$ and having outer and inner sets of field poles 18 and 20, respectively. The field poles 18 and 20 are in conventional manner coordinated with respect to the rotor axis $x$, i.e., all poles are equiangularly spaced from each other and disposed circularly about the rotor axis $x$, with successive poles of either set alternating with successive poles of the other set and the poles of at least one set, presently the outer poles 18, extending in the direction of the rotor axis to present to the rotor 6 pole faces 22 on a common level with the pole faces 24 of the inner poles 20 (see also FIGS. 4 and 8). The coil receptacle 10 is assembled with both field plates 14 and 16 and connects the latter around the coil 8, thus closing the magnetic field between the outer and inner pole sets 18 and 20.

The rotor 6, which may have any conventional pole arrangement to assure self-starting of the motor on energization of the field coil 8, presently has two sets of diametrically opposite poles 26 and 28 of which the poles of each set have permanent polarities of opposite signs. The rotor 6 is in the present instance turnable on a fixed shaft 30 which is mounted on the field structure in a manner described hereinafter and has its axis coextensive with the rotor axis $x$. Presently turnable with the rotor 6 is a pinion 32 which may drive any suitable reduction gearing (not shown) for a desired lower output speed of the motor.

The operation of the motor is entirely conventional. Thus, on energization of the field coil 8 the outer and inner field poles 18 and 20 will have instantaneous polarities of opposite signs and their polarities will alternate in phase with the A.C. current applied to the field coil, compelling the rotor 6 to start in either direction and continue to step or turn in synchronism with the alternation of the current. Motors of this type are frequently provided with a conventional direction control (not shown) which determines the desired drive direction of the rotor 6 and which reverses the latter on its random self-start in the opposite direction.

In accordance with an important aspect of the present invention, the field plates 14 and 16 with their respective poles 18 and 20 are formed as a compact polar unit 34, and the field plates are to this end permanently united by intermediate connector arms 36 (FIGS. 4 and 8). In the present exemplary polar unit 34, the connector arms 36 are integral and continuous with both field plates 14 and 16, and are presently formed by outer poles 18 on the inner plate 14 and extensions 38 thereof which pass to and are continuous with the outer plate 16. The parts 38 of the connector arms 36 presently divide into diverging branches 40 which are cross-sectionally dimensioned to become substantially flux-saturated on flux flow in the field plates 14 and 16, so that the connector arms 36 afford no effective short-circuiting paths for flux between these plates. The connector arms 36 are, therefore, appropriately referred to hereinafter as "saturation" arms or arms "of saturation type," although in the present instance only their branches 40 are of saturation-type and their pole parts 18 pass as much flux to and from the rotor as the remaining outer field poles 18. The saturation arms 36 thus firmly unite and integrate the axially spaced field plates 14 and 16 and fix the above-described coordination of the field poles 18 and 20 with respect to the rotor axis $x$.

Involved in the formation of the polar unit 34 is a method which forms another important aspect of the present invention. Essentially, this method comprises the step of shaping a plate of non-permanent magnetic stock about a reference rotor axis thereof into flat inner and surrounding outer blanks of the outlines of the respective inner and outer field plates and with spaced saturation arms intermediate and connecting both blanks and being continuous with and integrating the latter; and the further step of forming the blanks into the spaced field plates and coordinating and permanently fixing the coordination of their poles, by relatively displacing in a forming die the blanks in the direction of this reference axis and also drawing their integrating arms into uninterrupted coextension and continuity with both field plates. The great advantage secured in the pursuit of this method is that the fixed pole coordination is accurate within die tolerance and, hence, may be kept exceptionally accurate.

The present method is depicted in FIGS. 3 to 7, and the plate or blank 42 formed in the first step of the method is shown in FIG. 3. This blank 42 has an inner blank part 14' and surrounding outer blank part 16' with outer and inner peripheries 44 and 46, respectively, shaped to define the respective outer and inner poles 18 and 20 about the reference rotor axis $x'$ of the blank, with gaps 48 and 50 between the respective outer and inner poles, and the intermediate saturation arms 36 which extend between the outer and inner peripheries 44 and 46 of the inner and outer blank parts 14' and 16' and merge therewith as at 52 and 54, respectively. More particularly, the exemplary saturation arms 36 extend from the inner blank part 14' as regular outer poles 18 thereof, and their saturation branches 40 merge with the inner periphery 46 of the outer blank part 16' within gaps 50 between the inner poles 20.

The blank 42 may be partly formed in a suitable cutting die, such as that denoted by the reference numeral 56 in FIGS. 5 and 6, for example. Thus, flat magnetic plate stock may be held between upper and lower die members 58 and 60 of which the upper die member may close on the plate stock resting on the lower die member. The blank 42 may then be cut along its perimeter $p$ from the plate stock by die members (not shown), and punches 62 and 64 in the upper die plate 58 may be driven through the clamped blank and into mating die apertures 66 and 68 in the lower die member 60 to shear stock from the blank for defining therein the apertures 70 and 72, respectively (FIG. 3). Next, punches 74 in the lower die member 60 may be driven into the clamped blank to sever the outer poles 18 on the inner blank part 14' from the outer blank part 16' (FIG. 5). The blank may then be removed from the die 56, and the blank will then be as shown in FIG. 3, except that the inner poles 20 of the outer blank part 16' are as yet continuous with the inner blank part 14'.

The blank may next be placed into a suitable combined cutting and forming die, such as the one denoted by the reference numeral 76 in FIGS. 7 and 7A, for instance, in which the blank is clamped in its flat condition between initially coplanar surfaces 78 and 80 of outer and inner companion die members 82 and 84. Prior to closing the upper die members 82 and 84 on the blank on the lower companion die members, the blank is properly located in the die, i.e., the blank is oriented with its reference axis $x'$ in coextension with the die axis $x''$ and with its outer poles 18 in alignment with the pole-forming recesses 86 in the presently lower die member 82. The is accomplished in the present instance by placing the blank 42 with its apertures 72 (FIG. 3) over form-fitting dowels 90 in the lower die member 82 (FIG. 7). Punches 92 in the upper die member 82 may next be driven into the blank (FIG. 7A) to sever the inner poles 20 of the outer blank part 16' from the inner blank part 14' (see also FIG. 3). For forming the inner and outer blank parts 14' and 16' into the respective spaced field plates and coordinating and also fixing the coordination of their poles with respect to the reference axis $x'$, the inner and outer blank parts 14' and 16' of the blank are next relatively displaced in the direction of the die axis $x''$, presently by simultaneously moving the inner die members 84 with the inner blank part 14' therebetween in the direction of the arrow 96 in FIG. 7 and relative to the outer die members 82 with the outer blank part 16' therebetween, drawing thereby the outer poles 18 into the pole-forming recesses 86 (FIG. 7) in which they assume their final disposition in the direction of the reference axis $x'$ of the blank, with their pole faces 22 being then on a common level with the pole faces 24 of the inner poles (FIGS. 7 and 7A). Simultaneously with the relative axial displacement of the blank parts 14' and 16' in the present die 76, the saturation arms 36 of the blank are also drawn into uninterrupted coextension and continuity with both displaced plate parts. Since the exemplary saturation arms 36 are formed in part by outer poles 18 which together with the remaining outer poles on the inner plate part 14' are in the pole-forming die recesses 86 drawn into axial extension, parts of the saturation arms other than their respective outer poles must necessarily be permanently deformed in order that these arms may remain coextensive and continuous with the blank parts 14' and 16' throughout and at the end of their relative axial displacement. A comparison between the blank 42 of FIG. 3 and the finished polar unit 34 of FIG. 4 will readily indicate that the pole extensions 38 of the saturation arms, including their diverging branches 40, are permanently deformed to an extent commensurate with the imperative elongation of these arms between the axially displaced blank parts 14' and 16'. As a final step in the present exemplary formation of the polar unit 34, and while the blank parts 14' and 16' are still held in their axially displaced relative position in the die 76 (FIG. 7), a center punch 100 is driven through the inner blank part 14' and into a mating die aperture 102 in the lower die member 84, to form in this inner blank part a preferably circular aperture 104 (FIG. 4) in which to locate bearing means for the rotor of the motor. With the formation of the aperture 104 in the inner blank part of the blank 42, the formation of the latter into the polar unit 34 is completed and the same is removed from the die 76.

As previously mentioned, the saturation arms 36 must undergo permanent deformation in the course of their imperative elongation between the axially displaced field plates 14 and 16. Therefore, and in accordance with the present invention, the saturation arms are in the blank 42 initially shaped so that they may undergo permanent deformation commensurate with their subsequent imperative elongation and without setting up prohibitive stresses in these arms which might structurally weaken the polar unit or force the field poles thereof out of their correct coordination with respect to the rotor axis. To this end, the saturation arms may initially be of general bow shape so as readily to respond primarily by tolerable bending to their elongation between the axially spaced field plates. In the present exemplary blank 42, a specific initial bow shape of the saturation arms is achieved by dividing the pole extensions 38 thereof into the diverging branches 40. Thus, the pole extensions 38 of the saturation arms 36 are in their finish-formation subjected primarily to tolerable bending stresses, leaving the finish-formed saturation arms with permissible permanent stresses which neither weaken the polar unit structurally nor adversely affect the accurate die-implemented coordination of the poles thereof.

The described die-formed polar unit 34 makes for highly efficient mass production of field structures at an exceedingly low cost, especially since in this polar unit the outer and inner pole sets are already assembled and fixed in their correct coordination with respect to the rotor axis. The die formation of the polar unit further fixes the coordination of the pole sets with an accuracy which is in no wise adversely affected by tolerances, no matter how large, in the rest of the field structure, and which is within die tolerance and, hence, exceptionally high in an even reasonably closely held die operation. Conversely, the polar unit may be assembled with the rest of the field structure without any regard to tolerances in the rest of the field structure, and with sole regard to direct flux linkage of its field plates with the rest of the field structure. Furthermore, the inner field plate of the polar unit is exclusively formed of plate stock which must necessarily be removed from the outer field plate thereof for the outline of the pole pattern in the latter, thereby achieving a very large saving in field plate stock and an appreciable reduction in the cost of field structures for this reason alone. Also, the described preferred formation of the center aperture in the inner field plate of the polar unit after the relative axial displacement of both field plates thereof and while the latter are still locked in their relative displaced position in the die, makes for optimum accuracy of the coordination of the poles with the center axis of this aperture which is the true rotor axis by virtue of the described function of this aperture to locate bearing means for the rotor. Moreover, the polar unit not only greatly facilitates the assembly of the overall field structure since no close tolerances have to be kept, but it also affords a wide choice in the design and also mode of assembly of the field structure.

A singular advantage of the polar unit pointed out with particularity is the permissible elimination of one of the hitherto imperative attachments of both field plates to their magnetic closure around the field coil, this by virtue of the integration of the field plates within the present unit. Thus, the magnetic field closure may permanently be held in engagement, and preferably mere abutting engagement, with both field plates of the polar unit on being secured to only one of these field plates, thereby permitting wide tolerances in the location of the field closure on the field plates as well as obviating in the field plates any stresses from the field closure which might tend to disturb the field pole coordination.

Exemplary of the facile and advantageous assembly of the overall field structure afforded by the polar unit is the motor shown in FIG. 2. Thus, the field coil 8 is placed in the receptacle 10 and the latter secured to the polar unit 34 by a mere shoulder formation 106 on an enlarged end 108 of the rotor shaft 30 which is also secured to the polar unit 34. More particularly, the enlarged shaft end 108 extends through an aperture 110 in the coil receptacle 10, and further extends through the center aperture 104 in the inner field plate 14 with a close fit so as accurately to locate the rotor shaft 30 with its axis coinciding with the rotor axis $x$ of the polar unit. The rotor shaft 30 may with its enlarged end 108 simply be staked to the inner field plate 14 as at 112, the shoulder formation 106 on the enlarged shaft end holding the receptacle 10 in permanent abutting engagement with the inner and outer field plates 14 and 16 of the polar unit. The coil receptacle 10 is presently a preferably drawn cup, having an outer rim 114 with a top flange 116, and further having an integral inward core 118 in the form of an inverted cup and formed by another rim 120 and a wall 122 of the receptacle. It is presently the wall 122 of the coil receptacle 10 which is solely secured at 106 to the polar unit 34 in abutting engagement with the inner field plate 14 thereof, the outer top flange 116 of the coil receptacle being held in abutting engagement with the outer field plate 16 by virtue of the described attachment of the receptacle to the inner field plate 14. With the coil receptacle 10 being solely secured to, and hence located on, the inner field plate 14 of the polar unit, the outer top flange 116 of the receptacle is free to find its own location on the outer field plate 16 of the polar unit. Also, the coil receptacle 10 may in its assembly with the polar unit 34, be located on the inner field plate 14 within relatively wide tolerances, by making the aperture 110 in the receptacle wall 122 sufficiently large to have lateral clearance from the enlarged end 108 of the rotor shaft 30. Finally, since the coil receptacle 10 takes no part in the coordination of the field poles, it is entirely feasible, and in some cases advantageous, to use in lieu of the peripherally closed cup-type receptacle a strap-type receptacle (not shown) that may in longitudinal section be the same as that of the receptacle 10 in FIG. 2.

While in the exemplary motor of FIG. 2 the rotor shaft 30 is fixed on the field structure 4, FIG. 2A shows a motor 2′ in which the rotor shaft 30′ carries, and hence turns with, the rotor 6′ and pinion 32′. The rotor shaft 30′ is presently journalled in a suitable lubricated bearing 126 of which a reduced part 128 is located in the center aperture 104′ in the inner field plate of the polar unit 34′ and is attached to this field plate as at 112′, at the same time securing to the latter also the coil receptacle 10′.

Reference is now had to FIGS. 9 and 10 which show a somewhat modified blank 42a and a correspondingly modified polar unit 34a into which the blank is formed. The present modified blank 42a differs from the described blank 42 (FIG. 3) by having mere slits 130 which divide the saturation arms 36a from the outer blank part 16a, resulting in the reformation of the saturation arms as shown in FIG. 10 on the finish-formation of the polar unit.

While in the previously described polar units 34 and 34a the inner and outer field plates are integrated by saturation arms which are integral with both field plates, FIGS. 12 to 14 show a modified polar unit 140 with a rotor axis $y$ of which the inner and outer field plates 142 and 144 are also integrated by saturation connectors 146 which are, however, integral with only one field plate and otherwise united with the other field plate. The present polar unit 140 is further characterized in that the same is formed of a solid blank 150 of which the entire plate stock, save that removed for the formation of a center aperture 152 in the inner field plate 142 (FIG. 12), goes into the formation of the outer and inner field plates. To this end, the blank 150 is, in a die operation to be described, divided or parted into inner and outer blank parts 142′ and 144′ of which the inner one fits exactly in the outer one (FIG. 11). Thus, the inner and outer blank parts 142′ and 144′ have outer and inner peripheries 154 and 156, respectively, which are of the same identical outline and size. The outer periphery 154 of the inner blank part 142′ outlines the inner field plate 142 with its outer field poles 158, while the inner periphery 156 of the outer blank part 144′ outlines the outer field plate 144 with its inner field poles 160. The peripheries 154 and 156 of the blank parts 142' and 144' further outline the saturation connectors 146 which presently are formed by arms 162 on one blank part and their later described junctions with conforming slots 164 in the other blank part. The arms 162 are in this instance formed by some, presently three, outer poles 158 of the inner blank part 142' and extensions 166 thereof, while the conforming slots 164 are provided in the outer blank part 144'. The outlined outer and inner poles 158 and 160 and pole extensions 166 are arranged concentrically with respect to, and presently extend radially of, a common reference rotor axis y' of both blank parts.

For the formation of the blank 150, plate stock may be placed into a suitable open die, such as the die 170 in FIGS. 15 to 17, for example, and the die closed on the stock to clamp it therein between surfaces 172 and 174 of upper and lower companion die members. A part (not shown) of the die may then cut the solid blank 150 from the plate stock, and inner companion die members 176 and 178 may jointly be displaced in the direction of the die axis y'' and relative to outer companion die members 180 and 182 to sever the inner blank part 142' from the solid blank 150, leaving the latter as the outer blank part 144' between the outer companion die members 180 and 182 (FIG. 15). The inner and outer peripheries of the outer and inner blank parts in the die are as shown in FIG. 11, with the reference rotor axis y' of both blank parts being coincident with the die axis y'' (FIG. 15). For a better understanding of the subsequent blank formation, it is pointed out that the companion die members 178 blank the angularly spaced arms 162 of the inner blank part 142' from the solid blank 150 (FIG. 15), leaving the outer blank part 144' with the conforming slots 164 (FIG. 11). Next, while the companion die members 178 remain in the position shown in FIG. 15 and hold the inner blank part 142' axially separated from the outer blank part 144', the companion die members 176 and 182 are further displaced in the direction of the die axis y'' (FIG. 16) to draw the outer and inner poles 158 and 160 into their final extension in the direction of the die axis, though in opposition to each other. To this end, the upper die member 176 and lower die member 180 are provided with pole-forming recesses 184 and 186, respectively, into which the respective outer and inner field poles 158 and 160 are drawn into their axial disposition.

In thus drawing the inner and outer poles 160 and 158 into their axial disposition, the extensions 166 of the respective outer poles are left as radial outward projections on the latter, and the inner and outer blank parts 142' and 144' are now finish-formed into the respective inner and outer field plates 142 and 144 (FIGS. 14 and 16). However, the finished field plates 142 and 144 are still separated from each other (FIG. 16) since the die members 178 still hold the pole extensions 166 on the inner field plate 142 out of the slots 164 in the outer field plate 144 with which they are to be joined for integration of both field plates. Before integrating the field plates, however, a center punch 190 may be driven into the inner field plate (FIG. 16) to form therein the aperture 152 centered on the coincident reference and die axes y' and y''.

For permanent integration of both field plates 142 and 144 and also for final coordination of both sets of outer and inner field poles with the rotor axis y, the die members 176, 178, 182 and the locked inner field plate 142 therebetween are jointly displaced axially into the position shown in FIG. 17 in which the pole extensions 166 on the inner field plate have been reentered into their conforming slots 164 in the outer field plate. Since the field plate integrating outer poles 158 and their extensions 166, and hence also the conforming slots 164 are presently of uniform widths, it stands to reason that on the described reentry of the pole extensions 166 into the slots 164 the former are jammed in the latter with sufficient firmness permanently to unite both field plates. The jam of the pole extensions 166 in the slots 164 on reentry of the former into the latter may be of considerably greater firmness on forming the field plate integrating outer poles 158 and their extensions 166, and hence also the conforming slots 164, with a slight taper, as will be readily understood. However, it is preferable to carry the jam of the pole extensions 166 in their conforming slots to a positive interlock of their contacting edges with the latter and to this end staking punches 192 in the upper die member 178 are driven into the reentered pole extensions 166 (FIGS. 17 and 18). The present exemplary staking punches 192 spread the reentered pole extensions 166 thereat widthwise and drive their opposite edges into positive interlock with the confronting edges of the slots 164 in a fashion like or similar to that shown in FIG. 18. The formation of the polar unit 140 is now completed and the same is removed from the die 170.

As mentioned hereinbefore, the field plate integrating connectors 146 are of saturation type, and their saturation on flux flow in the field plates is presently confined to the interjammed edges of the pole extensions 166 and respective slots 164, the parts involved in forming these connectors having been dimensioned accordingly.

With the inner and outer peripheries 156 and 154 of the outer and inner blank parts 144' and 142' being of identical outline and size (FIG. 11), the complete identity of these peripheries in outline and size is readily determinable and even discernible in the finished polar unit (FIGS. 12 to 14). Also, since the present polar unit 140 is formed of the solid blank 150 without loss of any plate stock other than that removed for the formation of the center aperture 152 in the inner field plate, it is preferable to shape the inner and outer blank parts 142' and 144' so as to require axial extension of both, the outer and inner poles 158 and 160 for their coordination with the rotor axis y in a single die operation and without necessitating any additional pole alignment circularly about the rotor axis. To this end, the outer and inner poles proper on the inner and outer blank parts 142' and 144' (FIG. 11) project from opposite sides of a circular blank area a defined between the dot-and-dash line circles c, and the pole-forming recesses 184 and 186 in the respective die members 176 and 180 (FIG. 16) are so arranged that the finish-formed poles therein turn from the flat plate portions of the respective field plates into their axial disposition within this circular blank area a (see also FIGS. 13 and 14). Moreover, in order that successive poles of the polar unit 140 may have adequate gaps g between them (FIGS. 13 and 14), the poles proper on the inner and outer blank parts 142' and 144' are widthwise dimensioned accordingly, preferably from their start at the circular blank area a (FIG. 11) which compels the complemental trapezoidal shapes of the portions of both blank parts within this circular blank area a.

The present polar unit 140 has all the advantages of the completely integral polar unit 34 of FIGS. 4 and 8, including firm and permanent integration of its field plates, while having only negligible permanent stresses in its field plate integrating connectors. The present polar unit 140 has the further advantage of readily permitting axial spacing of the field plates within wide limits, this by virtue of the fact that their integrating connectors impose no varying stresses on the unit with varying spacing of its field plates. The axial extension of both sets of outer and inner poles in the present polar unit is further advantageous, in that the poles of both sets have optimum flux linkage with a rotor anywhere within the considerable axial spread of their interprojected pole faces 194 (FIG. 13), or have optimum flux linkage with an exceptionally powerful rotor of a thickness in excess of that of the field plate stock.

While the exemplary dies 56, 76 and 170 (FIGS. 5 to 7 and 15 to 17) for the formation of the described polar units 34 and 140 are shown in sufficient detail to understand their operation, it is deemed unnecessary to show them in greater detail, partly for the sake of simplicity of the drawings and partly because the same or similar dies for forming the specific blanks and finishing them into the specific polar units are easily within the skill of an experienced die designer or maker.

Reference is now had to FIGS. 20 and 21 which show a modified polar unit 200 of integrated inner and outer field plates 202 and 204 of completely integral type. This polar unit 200 differs from the polar unit 34 of FIGS. 4 and 8 in that the field plate integrating saturation arms 206 do not include any field poles but extend between and integrally join the flat portions of the field plates, with the saturation arms further being rectilinear in their extent and of sufficient lengths to undergo permissible permanent stretching for their uninterrupted coextension and continuity with the field plates in their axially spaced formation. The present polar unit 200 is formed of a flat blank 208 (FIG. 19) having inner and surrounding outer blank parts 202' and 204' with outer and inner peripheries 210 and 212, respectively, of the outlines of sets of outer and inner poles 214 and 216, respectively, about a reference rotor axis z' of the blank, with gaps being provided between the poles of either set. The outline saturation arms 206 in the blank 208 presently emerge at 215 from the outer periphery 210 of the inner blank part 202 and extend to and beyond the inner periphery 212 of the outer blank part 204' and are integral and continuous with the latter at 220 within its perimeter. More particularly, the saturation arms 206, which presently extend radially wtih respect to the reference axis z' of the blank, emerge from the outer periphery of the inner blank part 202' within gaps between successive outer poles 214 thereof and cross gaps between successive inner poles 216 of the outer blank part 204', with the lengths of the saturation arms extending beyond pole gaps in the outer blank part of their junctions 220 with the latter being struck from the outer blank part and leaving the latter with conforming slots 222 thereat. The arms 206 have intermediate, widthwise reduced, lengths 206' which provide for saturation of these arms.

In the formation of the inner and outer parts 202' and 204' of the blank 208 in a suitable die into the axially spaced field plates 202 and 204, with their poles coordinated with respect to the rotor axis z (FIGS. 20 and 21), the saturation arms 206 are drawn into the disposition shown in FIG. 21 in which they are in uninterrupted coextension and continuity with the flat portions of both field plates and are inclined thereto. In thus drawing the saturation arms 206 into uninterrupted coextension and continuity with the axially spaced field plates 202 and 204, the former will inevitably be permanently stretched. However, the ensuing permanent stretch of these arms is very small and entirely permissible, considering the very substantial lengths of these arms in comparison to the much smaller axial spacing of the field plates.

FIGS. 23 and 24 show another modified polar unit 34b which is in all respects like the polar unit 34 of FIGS. 4 and 8, except that the field plate integrating saturation arms 36b are formed by inner poles 20b of the outer field plate 16b and pole extensions 38b, of which the saturation branches 40b of the latter integrally join the inner field plate 14b at 230. The present polar unit 34b is formed from a blank 42b (FIG. 22) the die formation of which into this polar unit is obvious by now and requires no further explanation in view of the earlier detailed description of the formation of the polar unit 34.

Reference is now had to FIGS. 26 and 27 which show a further modified polar unit 240 of which the inner and outer field plates 242 and 244 are integrated by saturation arms 246 that are integral with one field plate, presently the inner one, and are otherwise united with the other field plate. The present polar unit 240 may be formed from a single blank 250 (FIG. 25) which in a suitable die operation is divided and shaped into separate inner and outer blank parts 242' and 244' of the outlines of the inner and outer field plates 242 and 244 with their respective outer and inner field poles 252 and 254. The inner blank part 242' further outlines the saturation arms 246 which presently extend radially with respect to the reference rotor axis X' of both blank parts, and have recessed lengths 256 that provide for saturation and continuing end lengths 258 of substantially uniform widths. The end lengths 258 of the arms 246 on the inner blank part 242' are presently blanked from the outer blank part 244', leaving the latter with conforming slots 260.

The blank 250 may be divided and shaped into the blank parts 242' and 244' and the latter formed into the finished polar unit 240 with the rotor axis X in a die operation similar to that shown in FIGS. 15 to 17. Thus, the blank parts 242' and 244' may in a suitable die be held axially spaced from each other but kept in the aligned relation shown in FIG. 25, whereupon they may in the same die be relatively displaced in the direction of the die axis for the formation of the inner field plate 242 including its arms 246 (FIG. 27), the exemplary outer blank part 244' being presently already in the form of the outer field plate. The field plates 242 and 244 are at the end of the relative axial displacement of their respective blank parts not integrated as yet, since the ends of the formed saturation arms 246 on the inner field plate are still axially separated from the aligned conforming slots 260 in the outer field plate. The formation of the polar unit is finally completed by permanently integrating the inner and outer field plates, and to this end the field plates are relatively displaced in the direction of the die axis to reenter the ends of the saturation arms 246 on the inner field plate in the slots 260 in the outer field plate (FIG. 27), thereby firmly jamming these arm ends in the respective slots. The reentered arm ends in the slots 260 may further be secured therein by staking in a manner similar to that shown in FIG. 18.

The present polar unit 240 of FIGS. 26 and 27 is also indicative of further polar units having all the advantages of the ones described. Thus, the inner field plate 242 may be formed from a blank which need not be an inner severed part of the blank from which the outer field plate is formed, and both blanks may in a forming die be properly aligned and then formed into the integrated polar unit. Furthermore, the integral saturation arms on one of the field plates may at their ends be permanently united with the other field plate in any suitable manner equivalent to and other than being jammed therein, such as by welding, for instance.

The present invention also contemplates and embraces the integration of two field plates of coplanar extent, with the effective inner and outer poles of the outer and inner plates preferably extending in the same axial direction from the common plane of both plates for the coordination of the poles with respect to the common rotor axis of the plates. The saturation-type plate-integrating arms may thus extend in the common plane of both field plates, and the inner field plate may have a center aperture for locating therein bearing means for a rotor for most accurate coordination of the field poles with the rotor axis.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method of forming from a flat plate of magnetic stock a polar unit of two integrated inner and surrounding outer field plates spaced apart in the direction of a rotor axis and with their respective outer and inner field poles coordinated with respect to said axis, which comprises, in a cutting die dividing and shaping the plate about a reference rotor axis thereof into flat inner and surrounding outer blanks of the outlines of the respective inner and outer field plates and with one blank also having spaced arms extending toward and into the other blank and being therewithin blanked from the latter to define conforming slots in said other blank; and forming the blanks into the spaced field plates and coordinating and permanently fixing the coordination of their poles, by relatively displacing in a forming die the blanks in the direction of said reference axis and also drawing the arms into coextension with and firmly jamming ends thereof in the conforming slots in the respective field plate to integrate both field plates, whereby the fixed pole coordination is accurate within die tolerance.

2. The method set forth in claim 1, which further comprises blanking in the same cutting die plate stock from the inner blank to form therein an aperture centered on said reference axis.

3. The method set forth in claim 1, which further comprises staking the jammed arm ends into interlock with their respective slots in said forming die.

4. The method of forming from a flat plate of magnetic stock a polar unit of two integrated inner and surrounding outer field plates spaced apart in the direction of a rotor axis and with their respective outer and inner field poles coordinated with respect to said axis, which comprises, in a combined cutting and forming die dividing and shaping the plate about a reference rotor axis thereof into flat inner and surrounding outer blanks of the outlines of the respective inner and outer field plates and with one blank also having spaced arms extending toward and into the other blank and being therewithin blanked from the latter to define conforming slots in said other blank; and while the same die is still closed on the blanks, forming them therein into the spaced field plates and coordinating and permanently fixing the coordination of their poles, by relatively displacing the blanks in the direction of said reference axis and also drawing the arms into coextension with and firmly jamming ends thereof in the conforming slots in the respective field plate to integrate both field plates, whereby the fixed pole coordination is accurate within die tolerance.

5. The method set forth in claim 4, according to which the inner blank is also formed with an aperture centered on said reference axis by blanking plate stock from the inner blank in the same die, whereby the fixed pole coordination with respect to the center axis of said aperture is accurate within die tolerance.

References Cited in the file of this patent

UNITED STATES PATENTS

| | | |
|---|---|---|
| 2,406,062 | Cornell | Aug. 20, 1946 |
| 2,609,596 | Clark | Sept. 9, 1952 |
| 2,919,776 | Pierce | Jan. 5, 1960 |